(12) United States Patent
Rose et al.

(10) Patent No.: US 8,126,139 B2
(45) Date of Patent: Feb. 28, 2012

(54) PARTIAL ENCRYPTION AND FULL AUTHENTICATION OF MESSAGE BLOCKS

(75) Inventors: Gregory Gordon Rose, San Diego, CA (US); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 12/174,477

(22) Filed: Jul. 16, 2008

(65) Prior Publication Data

US 2010/0002870 A1 Jan. 7, 2010

Related U.S. Application Data

(62) Division of application No. 10/226,457, filed on Aug. 23, 2002, now Pat. No. 7,415,109.

(51) Int. Cl.
*H04L 9/00* (2006.01)
(52) U.S. Cl. ............................................. 380/28; 380/42
(58) Field of Classification Search .................. 380/28, 380/42
See application file for complete search history.

(56) References Cited

U.S. PATENT DOCUMENTS 5,319,712 A * 6/1994 Finkelstein et al. ............ 380/44

* cited by examiner

*Primary Examiner* — Jacob Lipman
(74) *Attorney, Agent, or Firm* — Won Tae Kim (57) ABSTRACT

Methods and apparatus are presented for encrypting and authenticating data, wherein some data is encrypted and some data is not encrypted, but all of the data is authenticated. Masking modules (410) are used in a partial-block encryption mode to indicate which bits of a data block are to be encrypted.

5 Claims, 5 Drawing Sheets

PARTIAL ENCRYPTION AND FULL AUTHENTICATION OF MESSAGE BLOCKS

CLAIM OF PRIORITY UNDER 35 U.S.C. §120

The present Application for Patent is a Divisional of U.S. patent application Ser. No. 10/226,457 entitled "Partial Encryption and Full Authentication of Message Blocks" filed Aug. 23, 2002, now allowed, and assigned to the assignee hereof and hereby expressly incorporated by reference herein.

BACKGROUND

1. Field

The present invention relates to the field of data processing systems. In particular, to improving security in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems and information systems utilized in these fields. Cryptographic methods that provide such security are usually categorized according to two purposes: encryption and authentication. Encryption is the art of rendering data unreadable by unauthorized parties. Authentication is used to verify the integrity of the data. Verifying the integrity of the data involves verifying the author identity of the data and/or verifying whether the data has been altered.

Encryption systems are often referred to as cryptosystems, and have the property of being either symmetric or asymmetric. A symmetric encryption system uses a secret key to encrypt information and the same secret key to decrypt the encrypted information. An asymmetric encryption system, such as a public key cryptosystem, uses a first key to encrypt information and uses a different key to decrypt the encrypted information.

In many symmetric cryptosystems, one key is used for the encryption and a separate key is used for the authentication. Hence, in data processing systems using a symmetric cryptosystem, encryption and authentication are performed as two separate entities. Since authentication requires approximately as much processing power as encryption, the total amount of processing is equivalent to encrypting the data twice. In data processing systems that operate in a power-limited or hardware-limited environment, such as, e.g., a cellular telephone, personal digital assistant, or other portable communication device, it would be desirable to have a cryptosystem that can perform encryption and authentication as a single entity in order to reduce the computational load upon the device or to increase the speed at which the device performs the encryption and authentication.

In the paper "Parallelizable Encryption Mode with Almost Free Message Integrity" by Charanjit Jutla, cryptosystems were presented that can encrypt messages and authenticate the encrypted messages in a manner that requires little more processing than encryption alone. In other words, encryption and authentication can be performed efficiently as a single functional entity. Hence, the amount of processing resources required to provide security is reduced.

Both cryptosystems require the encryption of all the data that is to be transmitted. However, the requirement that all data of a message must be encrypted is undesirable in certain applications. For example, in communication protocols such as IPSec, encryption of all data is not efficient. A header portion of the data must be sent unencrypted for addressing purposes. The foundations of IPSec are specified in RFC 1825 entitled "Security Architecture for the Internet Protocol," RFC 1826 entitled "IP Authentication Header," and RFC 1827 entitled "IP Encapsulating Security Payload (ESP)," all of which were submitted by R. Atkinson in August, 1995.

Hence, there is a present need for a secure and efficient system for encryption and authentication of data wherein all data bits of a message need not be encrypted.

SUMMARY

Methods and apparatus are presented herein to address the need stated above. In one aspect, a method is presented for encrypting and authenticating data, the method comprising; arranging data into a plurality of plaintext blocks; identifying a set of partial blocks and a set of designated blocks from the plurality of plaintext blocks, wherein the set of partial blocks is a subset of the set of designated blocks; encrypting the plurality of plaintext blocks according to a mode of operation, wherein the mode of operation is for encrypting the plurality of plaintext blocks excluding the set of designated blocks and authenticating all of the plurality of plaintext blocks including the set of designated blocks; and for each block of the set of partial blocks, encrypting selected bits with a masking module.

In another aspect, an apparatus for encrypting and authenticating data is presented, comprising: at least one memory element; and at least one processing element configured to execute a set of instructions stored on the at least one memory element, the set of instructions for: arranging data into a plurality of plaintext blocks; identifying a set of partial blocks and a set of designated blocks from the plurality of plaintext blocks, wherein the set of partial blocks is a subset of the set of designated blocks; encrypting the plurality of plaintext blocks according to a mode of operation, wherein the mode of operation is for encrypting the plurality of plaintext blocks excluding the set of designated blocks and authenticating all of the plurality of plaintext blocks including the set of designated blocks; and for each block of the set of partial blocks, encrypting selected bits with a masking module.

In another aspect, an apparatus for encrypting and authenticating data is presented, comprising: a whole block encryption module for generating a plurality of authenticated, intermediate ciphertext blocks, wherein a portion of the plurality of intermediate ciphertext blocks are cleartext and a second portion of the plurality of intermediate ciphertext blocks are ciphertext; and at least one masking module for partially encrypting at least one of the plurality of authenticated, intermediate ciphertext blocks.

In another aspect, a method for encrypting and authentication a set of plaintext blocks is presented, comprising: identifying a set of designated blocks from the plurality of plaintext blocks; encrypting the plurality of plaintext blocks into a set of intermediate ciphertext blocks according to a mode of operation, wherein the mode of operation is for encrypting the plurality of plaintext blocks excluding the set of designated blocks and authenticating all of the plurality of plaintext blocks including the set of designated blocks; and encrypting each intermediate ciphertext block with an appropriate masking module.

In another aspect, an apparatus for encrypting and authentication a set of plaintext blocks is presented, comprising: at least one memory element; and at least one processing element configured to execute a set of instructions stored on the at least one memory element, the set of instructions for:

identifying a set of designated blocks from the plurality of plaintext blocks; encrypting the plurality of plaintext blocks into a set of intermediate ciphertext blocks according to a mode of operation, wherein the mode of operation is for encrypting the plurality of plaintext blocks excluding the set of designated blocks and authenticating all of the plurality of plaintext blocks including the set of designated blocks; and encrypting each intermediate ciphertext block with an appropriate mask.

In another aspect, a method for decrypting and verifying a plurality of received transmission blocks is presented, comprising: generating a plurality of intermediate ciphertext blocks from the plurality of received transmission blocks using at least one masking module, wherein each of the at least one masking module decrypts selected bits of a corresponding received transmission block; and decrypting the plurality of intermediate ciphertext blocks according to a mode of operation, wherein the mode of operation is for decrypting selected whole blocks of the plurality of intermediate ciphertext blocks and verifying the entire plurality of intermediate ciphertext blocks.

In another aspect, an apparatus for decrypting and verifying a plurality of received transmission blocks is presented, comprising: at least one memory element; and at least one processing element configured to execute a set of instructions stored on the at least one memory element, the set of instructions for: generating a plurality of intermediate ciphertext blocks from the plurality of received transmission blocks using at least one masking module, wherein each of the at least one masking module decrypts selected bits of a corresponding received transmission block; and decrypting the plurality of intermediate ciphertext blocks according to a mode of operation, wherein the mode of operation is for decrypting selected whole blocks of the plurality of intermediate ciphertext blocks and verifying the entire plurality of intermediate ciphertext blocks.

In another aspect, a method for encrypting and authentication data, is presented, comprising: arranging data into a plurality of plaintext blocks; identifying a set of partial blocks and a set of designated blocks from the plurality of plaintext blocks, wherein the set of partial blocks is a subset of the set of designated blocks; for each block of the set of partial blocks, encrypting selected bits with a masking module; and encrypting the plurality of plaintext blocks according to a mode of operation, wherein the mode of operation is for encrypting the plurality of plaintext blocks excluding the set of designated blocks and authenticating all of the plurality of plaintext blocks including the set of designated blocks.

In another aspect, an apparatus for encrypting and authenticating data is presented, comprising; at least one memory element; and at least one processing element configured to execute a set of instructions stored on the at least one memory element, the set of instructions for: arranging data into a plurality of plaintext blocks; identifying a set of partial blocks and a set of designated blocks from the plurality of plaintext blocks, wherein the set of partial blocks is a subset of the set of designated blocks; for each block of the set of partial blocks, encrypting selected bits with a masking module; and encrypting the plurality of plaintext blocks according to a mode of operation, wherein the mode of operation is for encrypting the plurality of plaintext blocks excluding the set of designated blocks and authenticating all of the plurality of plaintext blocks including the set of designated blocks.

In another aspect, an apparatus for decrypting and verifying a plurality of received transmission blocks is presented, comprising: a whole block decryption module for generating a plurality of authenticated, intermediate ciphertext blocks from the plurality of received transmission blocks, wherein a portion of the plurality of received transmission blocks are cleartext and a second portion of the plurality of received transmission blocks are ciphertext; and at least one de-masking module for decrypting selected bits of at least one of the plurality of authenticated, intermediate ciphertext blocks.

DETAILED DESCRIPTION

Figure 1A:
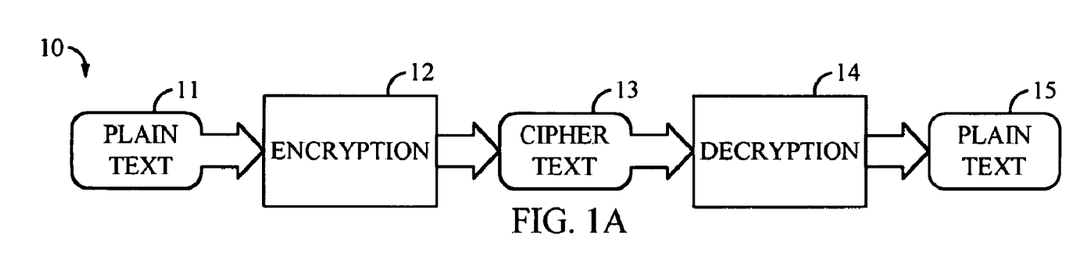
FIGS. 1A, 1B, 1C are block diagrams of a basic cryptosystem, a symmetric encryption system, and an asymmetric encryption system, respectively.

Encryption renders data unreadable by unauthorized parties. The original data message is referred to as a plaintext message or plaintext. The encrypted message is called a ciphertext, wherein encryption includes any means to convert plaintext into ciphertext. Decryption includes any means to convert ciphertext into plaintext, i.e., to recover the original message. FIG. 1A illustrates a basic cryptosystem 10 designed for encryption. The plaintext message 11 is operated upon by an encryption scheme 12 to form ciphertext 13. The ciphertext 13 is then transmitted through a communication channel (not shown) and undergoes a decryption scheme 14 at another site (not shown) to recover the plaintext 15. Plaintext and ciphertext can refer to any data, including audio and video data presented in digital form.

Cryptanalysis is the art of circumventing the security of cryptosystems. The entity performing the cryptanalysis is known in the art as an adversary or attacker. A cryptanalysis of an encryption scheme is directed towards decrypting an unauthorized message. A cryptanalysis of an authentication scheme is directed towards the composition of a message that can be verified as being sent by someone else.

A cryptosystem is based on secrets. A group of entities shares a secret if an entity outside this group cannot obtain the secret without expending a significantly large amount of resources. This secret is said to serve as a security association within the group of entities.

Figure 1B:
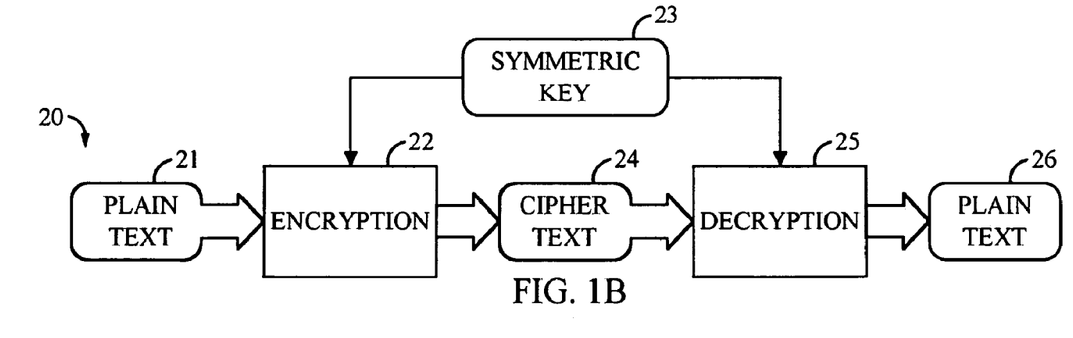

Typically, the secret comprises a key or a set of keys, which are measured in bits. The longer the key, the more cryptically secure the key will be. A symmetric cryptosystem uses the same secret key to encrypt a message as to decrypt a message. A symmetric encryption system 20 is illustrated in FIG. 1B, wherein both the encryption and decryption utilize a same private key. Plaintext 21 is operated upon by an encryption scheme 22. A secret key 23 is used in the encryption scheme 22 to form ciphertext 24. Cipher text 24 is transmitted over a communication channel (not shown) to another site wherein a decryption scheme 25 uses the same secret key 23 to form the plaintext 26.

Figure 1C:
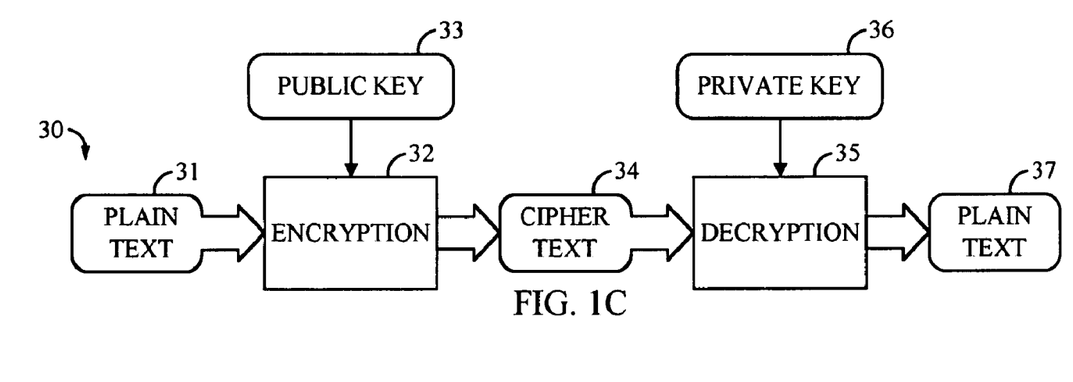

In contrast, an asymmetric cryptosystem uses a first key to encrypt a message and uses a different key to decrypt it. FIG. 1C illustrates an asymmetric encryption system known as a public key cryptosystem 30, wherein a public key is provided for encryption and a private key is provided for decryption. The public key is published, so that any party can use the public key to encrypt any message. However, only the privately held, unpublished key may be used to decrypt the message encrypted with the public key. Plaintext 31 is input into an encryption scheme 32, which uses a public key 33 that is associated with a designated party and obtained from a publication. The resulting ciphertext 34 is transmitted over a communication channel (not shown) to the designated party. The designated party uses a private key 36 in a decryption scheme 35 to convert the ciphertext 34 into plaintext 37.

Symmetric encryption is generally much faster than asymmetric encryption. However, transfer of the secret key from a sender to a recipient is problematic due to the possibility of interception by an adversary. One solution is to use a trusted third party to hold the keys, who will share a key only with an authorized party. The embodiments described herein do not address this problem, and assumes that the sender and receiver share a secret key.

The integrity of the ciphertext generated by the above cryptosystems is typically provided by appending some authenticating data to the transmitted ciphertext. The authenticating data is usually computed as a function of the message content and a secret integrity key.

In a symmetric authentication system, the authenticating data is known as a Message Authentication Code (MAC). The MAC is computed as a function of both the message content and a secret integrity key, wherein both the sender and the designated target share the secret integrity key. The sender transmits the message and appends the MAC. The message can be either plaintext or ciphertext. The receiver re-computes the MAC from the message and accepts the integrity of the message only if the re-computed MAC agrees with the transmitted MAC. Theoretically, only the sender of the message could generate a valid signature for that message, thereby authenticating the message for the receiver.

Figure 2A:
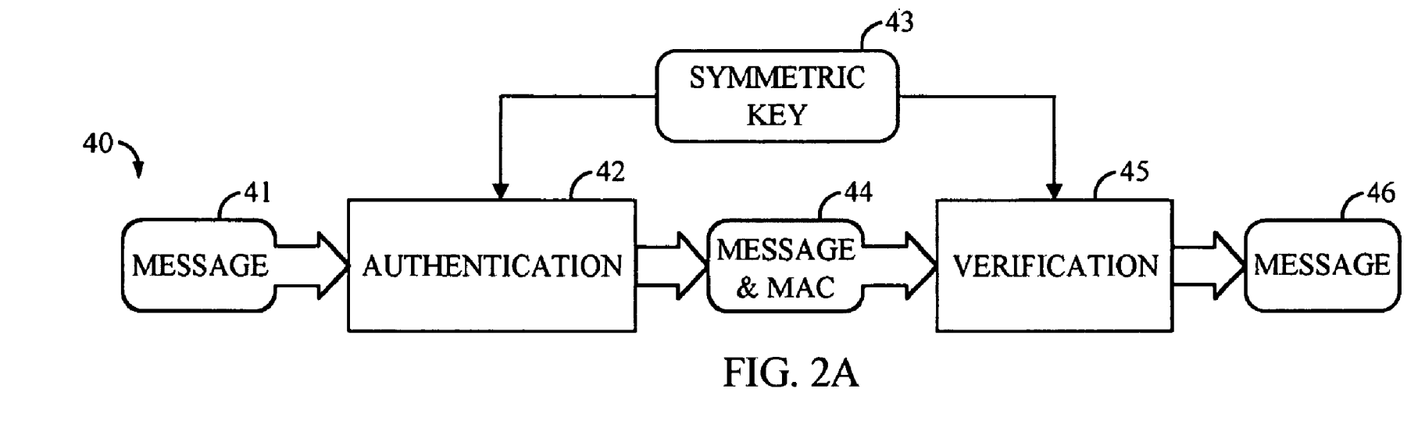
FIGS. 2A and 2B are block diagrams of a symmetric authentication system and an asymmetric authentication system, respectively.

A symmetric authentication system 40 is illustrated in FIG. 2A, wherein both the signing and verification utilize a same private key. The message 41 is operated upon by an authentication scheme 42 that uses a key 43 to form authenticating data 44. The authenticating data 44 and the message 41 are then transmitted through a communication channel (not shown) to another party (not shown). The message 41 is operated upon an authentication scheme 44 using a same key 43 to determine authenticating data 45. The authenticating data 45 that is generated by the receiving party is compared to the authenticating data 44 that is received over the communication channel.

Figure 2B:
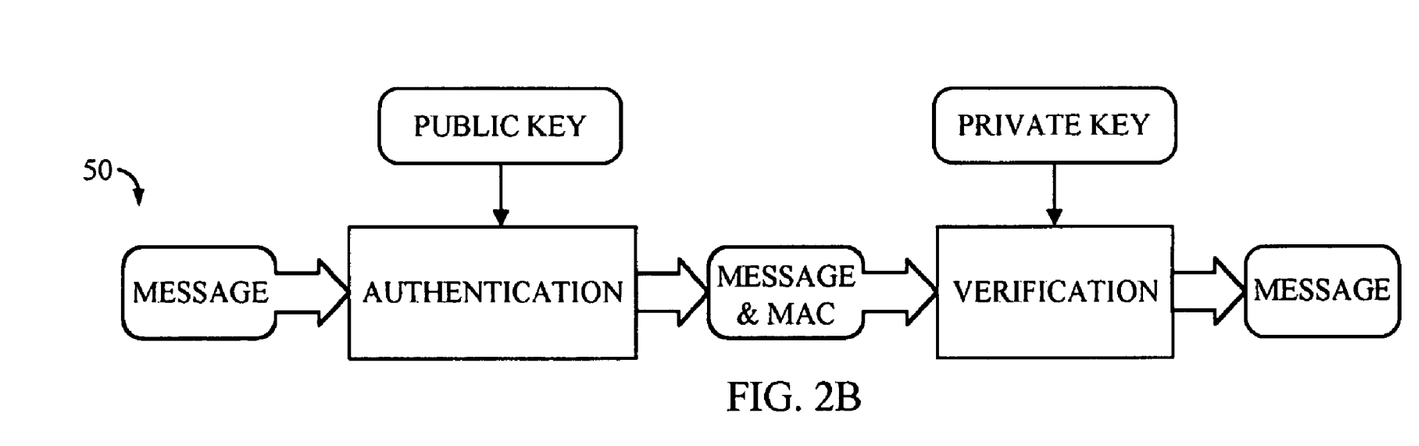

In an asymmetric authentication system, the authenticating data is known as a digital signature. The digital signature is computed as a function of the message content and a private integrity key of the sender. The sender transmits the digital signature to a receiving party, who then performs a verification upon the digital signature using a public key of the sender. An asymmetric authentication system 50 is illustrated in FIG. 2B, wherein the signing utilizes a private key and the verification utilizes the corresponding public key.

In some schemes, the MAC or digital signature is computed from a 'message digest' that contains a unique mathematical description of a secret message. The message digest is smaller in length than the original message, so that computations upon the message digest are more easily performed. Dependence of the MAC or digital signature upon a secret message or upon a message digest ensures that the authenticating data does not remain constant, since the secret message or message digest does not remain constant. If the authenticating data does remain constant across multiple messages, then an adversary could easily appropriate the authenticating data falsely.

The message digest is often computed using a cryptographic hash function. A cryptographic hash function computes a value (comprising a fixed number of bits) from any input, regardless of the length of the input. One property of a cryptographic hash function is that given an output value, it is computationally difficult to determine an input that will result in that output. An example of a cryptographic hash function is SHA-1, as described in "Secure Hash Standard," FIPS PUB 180-1, promulgated by the Federal Information Processing Standards Publications (FIPS PUBS) and issued by the National Institute of Standards and Technology (NIST).

A block cipher is a symmetric encryption scheme for which the input to the scheme is always a fixed length in bits. The length is known as the block size of the block cipher. An example of a block cipher is the Data Encryption Standard (DES) as described in "Data Encryption Standard", FIPS PUB 46-1 promulgated by the FIPS PUBS and issued by the NIST. DES has a block size of 64-bits. Another example of a block cipher is the Advanced Encryption Standard (AES) as described in "Advanced Encryption Standard", FIPS PUB 197 promulgated by the FIPS PUBS and issued by the NIST. AES has a block size of 128-bits.

The key length of a block cipher is the length of the key in bits. However, the entropy of a key is the logarithm (base 2) of the number of possible values for the key. The entropy is also written in terms of bits. For example, the DES has a 64-bit key, with 8 of these bits used as checksums to detect errors in key transmission. Consequently, the key-entropy of DES is (64−8)=56 bits.

Given several pairs of inputs and corresponding outputs of a block cipher, the block cipher key can be derived by an adversary who tests all possible key values in order to determine which inputs result in the correct outputs. This type of attack is known as an exhaustive key search. The computational complexity of this attack is the number of encryption operations required for the attack. Hence, an attack for extracting a k-bit key requires approximately $2^k$ encryption operations to extract the block cipher key in an exhaustive key search.

Block ciphers are useful for constructing other cryptographic entities. The way in which a block cipher is used is called a mode of operation. Four modes of operation for DES have been standardized and are described in "DES Modes of Operation", FIPS PUB 81, promulgated by the FIPS PUBS and issued by the NIST. These four modes are Electronic Codebook (EBC), Cipher Bock Chaining (CBC), Output Feedback (OFB) and Cipher Feedback (CFB). For illustrative purposes, only ECB and CBC are discussed herein to encrypt a sequence of plaintext blocks $P_1, \ldots,$ and $P_m$.

In ECB mode (FIG. 2A), the block cipher is used to encrypt each block of plaintext into a block of ciphertext according to the following relation:

$$C_i = E_K(P_i),$$

where $E_K(P_i)$ denotes the encryption of the block $P_i$ using the key K. Another expression "$D_K(P_i)$" is used herein to denote the decryption of the block $P_i$ using the key K.

In CBC mode (FIG. 2B), the first plaintext block is XORed with a secret initial value (IV) to form a result that is then encrypted. A mathematical description of this process is written in accordance with the relation:

$$C_1 = E_K(P_1 \oplus IV).$$

Thereafter, each plaintext block is XORed with the previous ciphertext prior to encryption as follows:

$$C_i = E_K(P_i \oplus C_{i-1}).$$

Efficient encryption and authentication can be problematic in symmetric cryptosystems. Until recently, the only solution to satisfy this requirement was to use a naïve approach: provide encryption and authentication as two separate functions. The two functions require approximately equal amounts of computation, so using both functions is twice as expensive as using only one or the other.

In the papers, "Parallelizable Encryption Mode with Almost Free Message Integrity" and "Encryption Modes with Almost Free Message Integrity," Jutla proposed two methods that provide encryption and authentication requiring only slightly more computations than either encryption or authentication alone. These methods are of a general form and employ a block cipher as a cryptographic kernel. In the cryptographic community, such a method is also called a "mode of operation." One of Jutla's mode of operations, known as Integrity Aware Parallelizable Mode (IAPM) with only XOR operations, IAPM uses two keys: $K_0$ and $K_1$. Suppose a sender wishes to encrypt and authenticate a message consisting of (m−1) message blocks $P_1$ through to $P_{m-1}$. The sender chooses a random value r that is placed in ciphertext block $C_0$. The value of r is encrypted to form value a using the key $K_0$. The value a is then used to derive pair-wise independent values $S_0$ through to $S_m$. $S_0, \ldots, S_m$ are pair-wise independent if $S_0, \ldots, S_m$ are uniformly distributed n-bit random numbers with the property that for every pair $S_i$ and $S_j$, where i≠j, and every pair of n bit constants $c_1$ and $c_2$, the probability that $S_i=c_1$ and $S_j=c_2$ is $2^{-2n}$. The actual computation of $S_0$ through to $S_m$ is not relevant to the understanding of IAPM and will not be described herein. Hereinafter, these pair-wise independent values will be referred to as "noise blocks." The values of the ciphertext blocks $C_1$ through to $C_{m-1}$, are derived as:

$$C_1 = E_{K1}(P_1 \oplus S_1) \oplus S_1,$$

$$C_2 = E_{K1}(P_2 \oplus S_2) \oplus S_2,$$

$$\ldots$$

$$C_{m-1} = E_{K1}(P_{m-1} \oplus S_{m-1}) \oplus S_{m-1},$$

wherein the key $K_1$ is used for each ciphertext block. The sender then computes a checksum value CHK, which is defined by:

$$CHK = P_1 \oplus P_2 \oplus \ldots \oplus P_{m-1} \oplus S_m.$$

A MAC tag $C_m$ is computed from CHK by encrypting with key $K_1$ and XORing $S_0$:

$$C_m = E_{K1}(CHK) \oplus S_0.$$

The sender transmits $C_0 \ldots C_m$.

Suppose a receiver receives $C'_0 \ldots C'_m$. The receiver begins the decryption process by first encrypting $r' = C'_0$ to form a', using the key $K_0$. The receiver then computes the values of $S'_0$ through to $S'_m$. The values of the plaintext blocks $P'_1$ through to $P'_{m-1}$, where $1 \leq i \leq m$, are derived as:

$$P'_1 = D_{K1}(C'_1 \oplus S'_1) \oplus S'_1,$$

$$P'_2 = D_{K1}(C'_2 \oplus S'_2) \oplus S'_2,$$

$$\ldots$$

$$P'_{m-1} = D_{K1}(C'_{m-1} \oplus S'_{m-1}) \oplus S'_{m-1},$$

wherein the key $K_1$ is used for each plaintext block. The receiver then computes a checksum value CHK' defined by:

$$CHK' = P'_1 \oplus P'_2 \oplus \ldots \oplus P'_{m-1} \oplus S'_m.$$

A value X is computed by encrypting CHK' with key $K_1$, and then XORing the encrypted result with $S'_0$. Mathematically, the process can be described as follows:

$$X = E_{K1}(CHK') \oplus S'_0.$$

If X and $C'_m$ are equal, then the receiver can be sure of the integrity of the encrypted message.

The Jutla's mode of operation has certain undesirable properties. The first undesirable property is the requirement that all of the data to be authenticated is sent encrypted. However, in Internet protocols such as IPSec, it is not desirable to transmit messages where all the data is sent encrypted. In particular, headers containing addressing information must be sent in the clear. A solution to this problem is presented in co-pending U.S. patent application No. 10/205,430, entitled "FAST ENCRYPTION AND AUTHENTICATION FOR DATA PROCESSING SYSTEMS," filed on Jul. 24, 2002, assigned to the assignee of the present invention and incorporated by reference herein.

In the aforementioned patent application, a solution to the above-stated problem allows blocks of the data to be sent as plaintext or ciphertext, wherein both the plaintext portion and the ciphertext portion of the message are still authenticated. The solution is referred to as the Hawkes-Rose-IAPM (HR-IAPM) mode. The HR-IAPM mode of operation uses two keys: $K_0$ and $K_1$. Suppose a sender wishes to encrypt and authenticate a message consisting of (m−1) message blocks $P_1$ through to $P_{m-1}$. The sender and receiver agree on the set of plaintext blocks U to be sent in unencrypted form, wherein the elements of U are referred to as cleartext positions.

The sender chooses a nonce value r and follows the IAPM mode to compute the noise blocks $S_0$ through to $S_m$ and the ciphertext blocks $C_0$ through to $C_{m-1}$. The nonce value r can be a value that is negotiated with a receiver or the nonce value can be predetermined.

The sender then computes checksum values CHK_IN and CHK_OUT, which are defined by:

$$CHK\_IN = (\oplus_{i \in U} P_i) \oplus S_m, \text{ and}$$

$$CHK\_OUT = (\oplus_{i \notin U} C_i) \oplus S_0.$$

A MAC tag $C_m$ is then computed by encrypting CHK_IN with key $K_1$, and the XORing the result with CHK_OUT. This process is described mathematically as follows:

$$C_m = E_{K1}(CHK\_IN) \oplus CHK\_OUT.$$

The sender re-sets those ciphertext blocks $C_i$ wherein i∈U, such that $C_i = P_i$ and transmits $C_0 \ldots C_m$.

The decryption and verification process for the HR-IAPM mode also differs from the decryption and verification process for the IAPM mode. Suppose a receiver receives transmission blocks $C'_0 \ldots C'_m$. Note that for i∈U, $C'_i$ was transmitted unencrypted. The receiver computes the values of $S'_0$ through to $S'_m$ using $C'_0$ and begins an iterative procedure to derive the plaintext block $P'_i$ from the received transmission blocks $C'_i$, wherein the receiver determines whether the received transmission blocks $C'_i$ are specified by a cleartext position or a ciphertext position.

If i∈U, then the receiver sets the plaintext blocks $P'_i = C'_i$. The receiver then uses the plaintext blocks $P'_i$ obtain secondary ciphertext blocks $C^*_i$, according to the formula:

$$C^*_i = E_{K1}(P'_i \oplus S_i) \oplus S_i.$$

If $i \notin U$, then the receiver decrypts to obtain the plaintext blocks $P_i$, as in the IAPM mode. The index i is incremented and the iterations continue for each received transmission block. The above process is for decrypting the received transmission blocks. The verification of the received transmission blocks is performed by computing a checksum value CHK_OUT', which is defined by:

$$CHK\_OUT' = (\oplus_{i \in U} C^*_i) \oplus S_o.$$

The receiver computes a checksum value CHK_IN', which is defined by:

$$CHK\_IN' = (\oplus_{i \notin U} P_i) \oplus S_m.$$

A value X is computed by encrypting CHK_IN' with key $K_1$, and the XORing the result with CHK_OUT'. This process is described mathematically as follows:

$$X = E_{K1}(CHK\_IN') \oplus CHK\_OUT'.$$

A comparison is then made between X and $C'_m$. If X and $C'_m$ are equal, then the receiver can be sure of the integrity of the message. The inclusion of the values $C'_i$, $i \notin U$ in the checksum forms a difference between the HR mode of operation and the mode of operation proposed by Jutla.

It should be noted that the decryption process and the verification process of the HR-IAPM mode can be selectively implemented either serially or in parallel, in accordance with system constraints. For a serial implementation of HR-IAPM, the decryption and the verification process can be performed in interchangeable order. A parallel implementation of the decryption and the verification steps would increase the speed at which the receiver can process the received transmission blocks.

Another mode of operation that allows blocks of the data to be sent as plaintext or ciphertext, wherein both the plaintext portion and the ciphertext portion of the message are still authenticated, is the Partial Encryption with Message Integrity (PEMI) mode. This mode is described in co-pending U.S. patent application Ser. No. 10/205,430, "FAST ENCRYPTION AND AUTHENTICATION FOR DATA PROCESSING SYSTEMS," filed on Jul. 24, 2002, assigned to the assignee of the present invention and incorporated by reference herein.

The PEMI mode allows a sender to transmit part of a message as plaintext, but still authenticate the plaintext. However, the PEMI mode follows the decryption steps that are used in IAPM, so that a receiver need not be reconfigured to perform the PEMI decryption. Hence, a receiver can decode messages sent according to either IAPM or PEMI. Note that the decryption process is conceptually distinct from the verification process as described below.

The PEMI mode of operation uses two keys: $K_0$ and $K_1$. Suppose a sender wishes to encrypt and authenticate a message consisting of (m−1) message blocks $P_1$ through to $P_{m-1}$. The sender and receiver agree on the set of plaintext blocks to be sent in unencrypted form. Let U denote the set of indices of the plaintext blocks to be sent in un-encrypted form, wherein the elements of U are referred to as cleartext blocks.

The sender chooses r and follows the IAPM mode to compute $S_0$ through to $S_m$. A decision is made as to whether $i \in U$, where $1 \leq i \leq m$.

If $i \in U$, then the sender generates ciphertext blocks $(C_1, \ldots, C_{m-1})$ by setting $C_i = P_i$. Intermediate ciphertext blocks $(N_1, \ldots, N_{m-1})$, intermediate plaintext blocks $(M_1, \ldots, M_{m-1})$, and authentication blocks $(Y_1, \ldots, Y_{m-1})$ are generated from plaintext blocks $(P_1, \ldots, P_{m-1})$ in accordance to the relations:

$$N_i = P_i \oplus S_i,$$

$$M_i = D_{K1}(N_i),$$

$$Y_i = S_i \oplus M_i;$$

If $i \notin U$, then the sender generates the authentication blocks by setting $Y_i = P_i$. The ciphertext blocks, intermediate ciphertext blocks, intermediate plaintext blocks and authentication blocks are generated in accordance to the relations:

$$M_i = P_i \oplus S_i,$$

$$N_i = E_{K1}(M_i),$$

$$C_i = S_i \oplus N_i.$$

After the above encryption steps, the sender computes a checksum CHK as:

$$CHK = Y_1 \oplus \ldots \oplus Y_{m-1}.$$

The sender then computes a MAC tag $C_m$ using the following relationships:

$$M_m = CHK \oplus S_m,$$

$$N_m = E_{K1}(M_m),$$

$$C_m = S_0 \oplus N_m.$$

The MAC tag $C_m$ is then appended to the message: the entire ciphertext to be transmitted is $(C_0, \ldots, C_m)$.

Suppose a receiver receives blocks $C'_0, \ldots, C'_m$. The PEMI mode uses the same decryption steps as described above for IAPM. Note that for $i \in U$, $C'_i$ was transmitted unencrypted. The receiver uses the nonce value r' to derive the values of $S'_0$ through to $S'_m$. The sender generates authentication blocks $(Y'_1, \ldots, Y'_{m-1})$ from ciphertext blocks $(C'_1, \ldots, C'_{m-1})$ according to the relations:

$$N'_i = C'_i \oplus S'_i,$$

$$M'_i = D_{K1}(N'_i),$$

$$Y'_i = S'_i \oplus M'_i.$$

The data blocks are defined, for $1 \leq i \leq m-1$, according to the following relations:

If $i \in U$, then $P'_i = C'_i$;

If $i \notin U$ then $P'_i = Y'_i$.

The MAC tag $C'_m$ is decrypted to determine checksum $Y'_m$ using the following relationships:

$$N'_m = C'_m \oplus S'_m,$$

$$M'_m = D_{K1}(N'_m),$$

$$Y'_m = S'_0 \oplus M'_m.$$

The receiver has now decrypted the ciphertext and the checksum, but the receiver needs to verify the integrity of the received transmission blocks. To verify the integrity, the receiver confirms that the checksum $Y'_m$ is equal to the value of $(Y'_1 \oplus Y'_2 \oplus \ldots \oplus Y'_{m-1})$. If the message integrity is verified, then the message is $P_1, \ldots, P_{m-1}$.

Other methods exist for encrypting only certain whole blocks of a data message and authenticating the entire data message as a single functional entity. For example, the Cipher Block Chaining (CBC-A and CBC-IO) modes of operation can also be implemented and are described in co-pending U.S. patent application Ser. No. 10/205,114 and U.S. patent application 10/205,132, both entitled, "EFFICIENT ENCRYPTION AND AUTHENTICATION FOR DATA PROCESSING SYSTEMS," both filed on Jul. 24, 2002, and both assigned to the assignee of the present invention and incorporated by reference herein. The methods described above for encrypting selected blocks of data do not address how one may encrypt selected portions of a block of data. Suppose a party wishes to encrypt a specific portion of a block $P_i$ but leave another portion of the block unencrypted. Such a block would be said to be partially encrypted. As defined, HR-IAPM and PEMI cannot be applied for this purpose, since these modes operate on entire blocks, so that an entire block is encrypted or is unencrypted. Block size is defined by the block cipher or mode of operation that is used. The embodiments described herein address the need to encrypt portions of a block of data and still provide strong authentication, wherein the encryption and authentication are performed as a single functional entity.

A partial-block encryption mode is presented herein. In general, a mask $M_i$, $1 \leq i \leq m-1$, is generated that indicates which bits of a data block are to be encrypted. In one embodiment, a binary "1" in a position k of the mask $M_i$ indicates that a value of a block $P_i$ in the same position will be encrypted, otherwise, a binary "0" is used. For illustrative ease, the following naming conventions will be used herein:

A subscript index indicates a given block from a plurality of blocks.

A superscript index indicates a position within a given block.

Hence, the term "$P_i^k$" represents the $k^{th}$ position in the block $P_i$.

In the embodiments for partial-block encryption mode, it is possible to use a mask $M_i$ that can be either secret or public. It should be noted that the sender and the receiver need to be in agreement as to contents of masks $M_1, \ldots, M_{m-1}$. If the sender and the receiver have not agreed a prior as to the contents of mask $M_i$, then mask $M_i$ should be authenticated as part of the message. If the entire block is to be sent encrypted, then mask $M_i$ has all bit positions $M_i^k$ set to "1." If the entire block is to be sent unencrypted, the mask $M_i$ has all bit positions $M_i^k$ set to "0."

Figure 3:
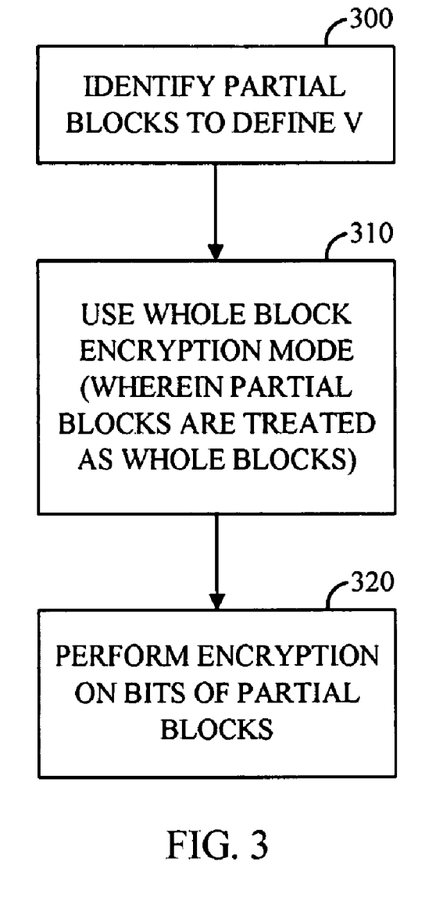
FIG. 3 is a block diagram of a partial block encryption/full block authentication process.

FIG. 3 describes a partial-block encryption process that uses masks $M_1, \ldots, M_{m-1}$. It should be noted that either hardware or software in data or communication systems could be configured to perform the different embodiments of the partial-block encryption process. Hardware may include, but are not limited to, processing elements that implement a set of instructions stored on a computer-readable medium, e.g., memory, to perform the encryption, authentication, decryption, and verification processes that are described herein. Moreover, the various combination steps are described using the bit-wise, logical exclusive- or operator. Other implementations of the embodiments can be performed by using modular integer addition operations, wherein two inputs are treated as binary representations of integers, an intermediate value is formed as the binary representation as the sum of the integers, and the output is formed by truncating the intermediate value to the cipher block size. Other group operators can be also be used with the appropriate modifications, however, for the purpose of illustrative ease, only the embodiments using XOR operators are described herein.

At step 300, a determination is made as to those blocks that are to be partially encrypted. Those blocks that are to be partially encrypted are referred to herein as partial blocks. Note that the sender may have specified whole blocks to be sent in unencrypted form and whole blocks to be sent in encrypted form. Define V as the set of block positions that correspond to partial blocks.

At step 310, the data is encrypted and authenticated according to an appropriate mode, such as HR-IAPM or PEMI, which are both modes that allow a sender to send encrypted and unencrypted whole blocks to a receiver. Using the appropriate mode, a set of plaintext blocks $P_1, \ldots, P_{m-1}$ are transformed into a set of intermediate ciphertext blocks $IC_0, \ldots, IC_m$. At this stage, partial blocks are treated as if they were to be sent unencrypted as whole blocks. Hence, the set of partial block positions V is a subset of the set of unencrypted blocks U.

At step 320, the bits of the partial blocks that are to be encrypted are manipulated such that:

$C_m = IC_m$; and $C_i = IC_i \oplus (M_i \text{ AND } E_{K1}(r \oplus i))$, where AND denotes the bit-wise AND operation, and $r = IC_0 = C_0$ is the nonce value used to derive the noise blocks $S_i$.

The value ($M_i$ AND $E_{K1}(r \oplus i)$) is equivalent to a random key stream that encrypts ONLY those bits that are to be transmitted in encrypted form. The bits that are to be sent in unencrypted form are not affected by the operation defined above. Using the output of $E_{K1}(r \oplus i)$ to encrypt data is known as "Counter Mode". This method is known to be secure, and is proposed in NIST publication SP 800-38A "Recommendation for Block Cipher Modes of Operation—Methods and Techniques," December 2001.

Note that the value of $E_{K1}(r \oplus i)$ need only be computed when $M_i$ is non-zero; that is, when only a portion of the block is sent in encrypted form. When $M_i$ is all ones or all zeros, the value of $E_{K1}(r \oplus i)$ need not be computed. These encryptions are computed in addition to the encryptions used in HR-IAPM mode or PEMI mode. However, in alternative embodiments, these operations can be performed in parallel with other block encryption or block decryption operations so the overall latency in the parallel mode need not increase. Moreover, the above embodiment describes the use of multiple masks, each masking possibly different positions. In some systems, it may be desired to use only a single mask for the partial block encryption process, if certain bit positions should always be sent in the clear.

Figure 4:
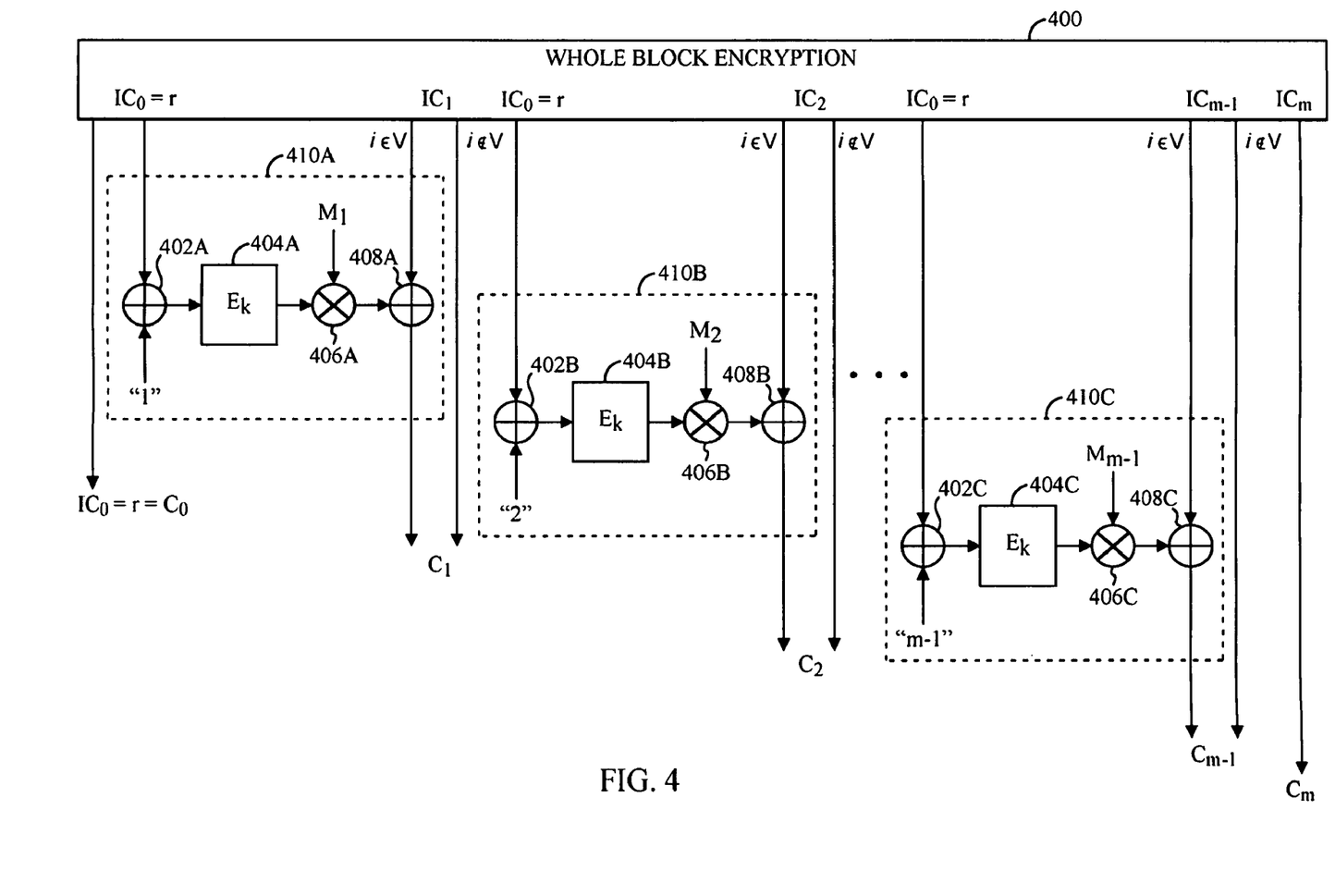
FIG. 4 is an apparatus for implementing a partial block encryption/full block authentication process.

FIG. 4 is a block diagram of an apparatus configured to perform the partial-block encryption process described above. It should be noted that FIG. 4 illustrates an implementation that can be an alternative to a software implementation, wherein a processor and memory is configured to execute a set of instructions for performing the above partial-block encryption process. At block 400, whole block encryption is performed so that blocks of the set U are left unencrypted, yet are still fully authenticated. A control element (not shown) decides whether a block of the set of U is also a member of the set V. If so, then the block is further encrypted by a masking module 410A, 410B, or 410C. For illustrative purposes only, a parallel configuration with three (3) sets of masking modules is described. A parallel configuration may be implemented in order to support a fast encryption. It should be noted that a serial implementation using a masking module(s) is also within the scope of the embodiments and could be implemented whenever the amount of available hardware resources is limited.

In one embodiment of a masking module 410A, 410B or 410C, a nonce value r is combined at a combiner element 402A, 402B or 402C, respectively, with an index value i, wherein $1 \leq i \leq m-1$ and $i \in V$. It should be noted that if a block is not designated as a member of V, the set of partial blocks, then that block need not be further processed by a masking module and can consequently bypass the masking modules. In an alternative embodiment, the blocks that need not be partially encrypted can pass through masking modules that implement masks with all "0"s in the bit positions.

In the embodiment of FIG. 4, the masking module further comprises having the output of the combiner element 402A, 402B or 402C input into an encryption block 404A, 404B or 404C. The output of encryption block 404A, 404B or 404C is input to a bit-wise AND operator 406A, 406B or 406C along with a mask $M_i$. The output of the bit-wise AND operator 406A, 406B or 406C is then combined with an intermediate ciphertext block $IC_i$ at combiner elements 408A, 408B or 408C, respectively, to produce a ciphertext block $C_i$.

It should be noted that cryptographic functions other than the Counter mode can be implemented along with the masks within the masking modules. For example, the Counter mode is a type of stream cipher. Other types of stream ciphers can be used to generate output that can replace the output of the function $E_k(r \oplus i)$. In this instance the stream cipher can be initialized with the nonce value r and key K in order to generate unique encryptions.

Figure 5:
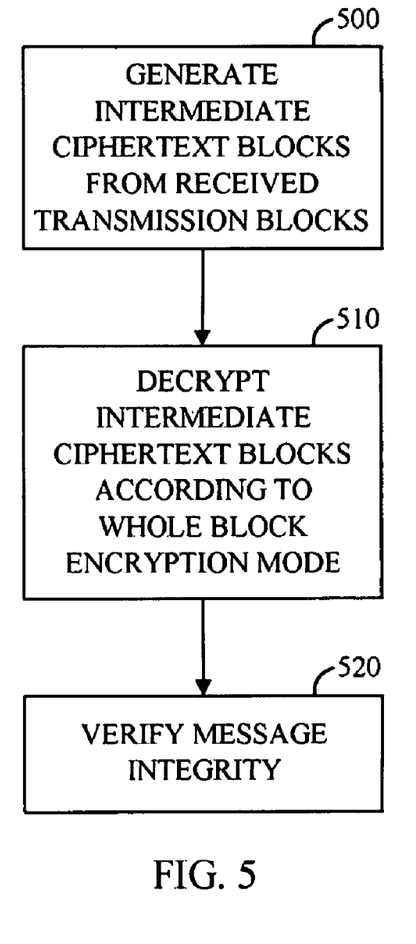
FIG. 5 is a block diagram of the decryption and verification for a partial block encryption/full block authentication process.

FIG. 5 describes a partial-block decryption process. At step 500, intermediate ciphertext blocks ($IC_0, \ldots, IC_m$) are generated according to the relationship:

$$IC_0 = C_0';$$

$$IC_m = C_m';$$

$$IC_i = C_i'(M_i \text{ AND } E_{K1}(r \oplus i)), \text{for } i \in V; \text{ and}$$

$$IC_i = C_i', \text{for } i \notin V.$$

wherein ($C_0', \ldots, C_{m-1}'$) are the received transmission blocks.

At step 510, the receiver uses the appropriate mode to decrypt the intermediate ciphertext blocks into plaintext blocks ($P_1, \ldots, P_{m-1}$).

At step 520, the message integrity of the intermediate ciphertext blocks is verified as prescribed by the appropriate mode.

It should be noted that the security of the message integrity for this partial-encryption mode follows from the security of message integrity of the underlying mode (HR-IAPM or PEMI). The security of the encryption for the fully encrypted blocks follows from the security of the encryption for the underlying mode. The security of the encryption for the encrypted bits of the partial blocks follows from the security of the "counter mode" encryption.

Figure 6:
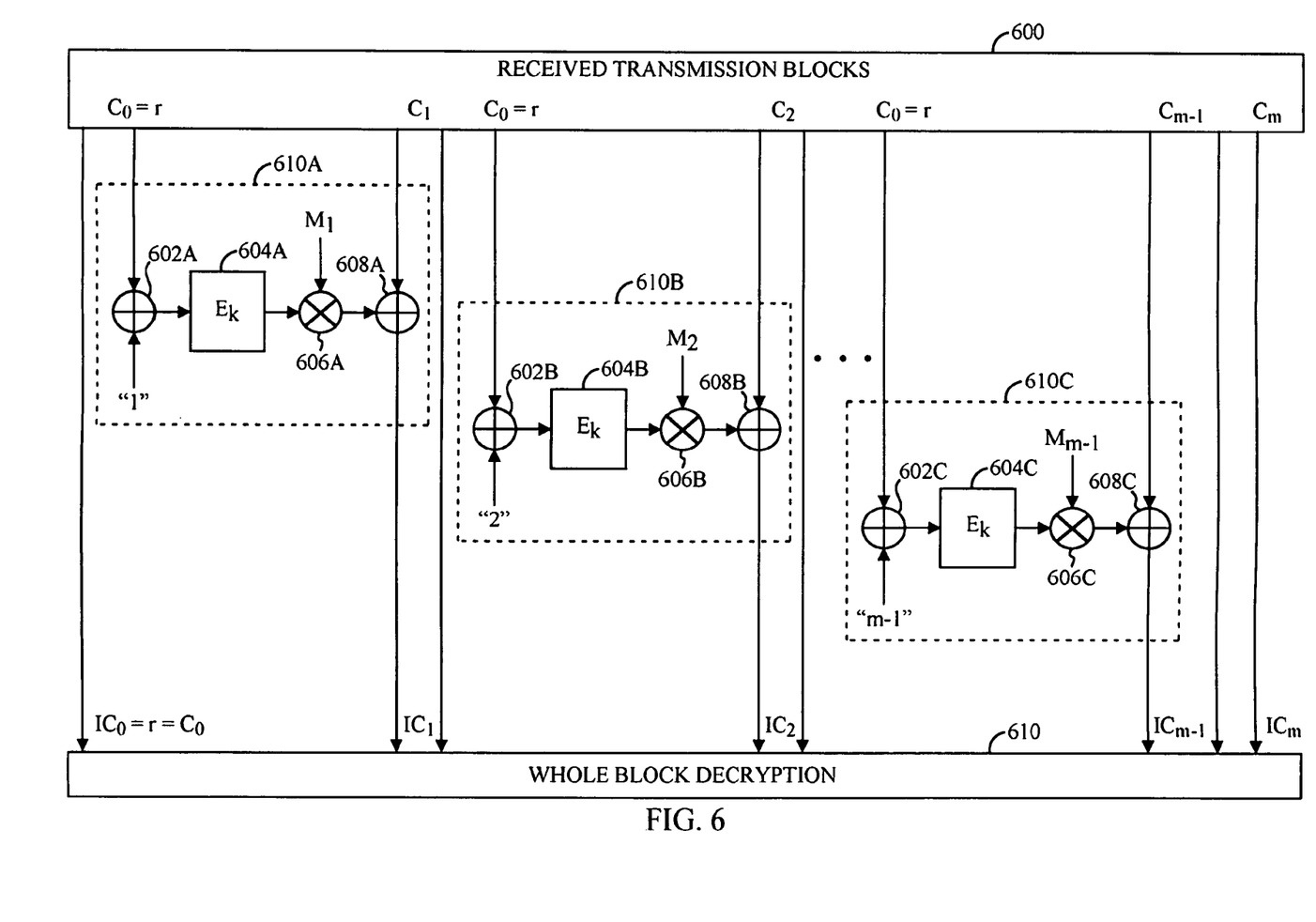
FIG. 6 is an apparatus for implementing the decryption and verification for a partial block encryption/full block authentication process.

FIG. 6 is a block diagram of an apparatus configured to perform the partial-block decryption process described above. It should be noted that FIG. 6 illustrates an implementation that can be an alternative to a software implementation, wherein a processor and memory is configured to execute a set of instructions for performing the above partial-block decryption process. A storage element 600 is configured to store the received transmission blocks $C_0, \ldots, C_m$. A control element (not shown) decides whether a block of the set of U is also a member of the set V. If so, then the block is further decrypted by a de-masking module 610A, 610B, or 610C. For illustrative purposes only, a parallel configuration with three (3) sets of de-masking modules is described. A parallel configuration may be used in order to support a fast decryption. It should be noted that a serial implementation using a de-masking module(s) is also within the scope of the embodiments and could be implemented whenever the amount of available hardware resources is limited.

In one embodiment of a de-masking module 610A, 610B or 610C, a nonce value r is combined at a combiner element 602A, 602B or 602C, respectively, with an index value i, wherein $1 \leq i \leq m-1$ and $i \in V$. It should be noted that if a block is not designated as a member of the set V of partial blocks, then that block need not be further processed by a de-masking module and bypass the de-masking modules. In an alternative embodiment, the blocks that need not be partially decrypted can pass through the de-masking modules that implement masks with all "0"s in the bit positions.

The output of the combiner element 602A, 602B or 602C is input into a decryption block 604A, 604B or 604C. The output of decryption block 604A, 604B or 604C is input to a bit-wise AND operator 606A, 606B or 606C along with a mask $M_i$. The output of the bit-wise AND operator 606A, 606B or 606C is then combined with a ciphertext block $C_i'$ at combiner elements 608A, 608B or 608C, respectively, to produce an intermediate ciphertext block $IC_i$. At block 610, whole block decryption and verification is performed upon the intermediate ciphertext blocks according to one of the modes described above.

In an alternate embodiment, the whole block encryption and authentication can be implemented after the plaintext is partially encrypted by the masking modules. In other words, the intermediate ciphertext blocks are determined by the masking modules and then input into the whole block encryption/authentication mode. Correspondingly, the order of the decryption would be reversed, so that the whole block decryption would occur before applying the de-masking modules.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for encrypting and authentication of a set of plaintext blocks, comprising:
    identifying a set of designated blocks from the plurality of plaintext blocks;
    encrypting the plurality of plaintext blocks into a set of intermediate ciphertext blocks according to a mode of operation, wherein the mode of operation is for encrypting the plurality of plaintext blocks excluding the set of designated blocks and authenticating all of the plurality of plaintext blocks including the set of designated blocks; and
    encrypting each intermediate ciphertext block with a masking module including selecting a mask that has a binary pattern, wherein the binary pattern identifies bits within the corresponding intermediate ciphertext block for encryption by the masking module and encrypting the identified bits within each intermediate ciphertext block by using the selected mask wherein encrypting each intermediate ciphertext block with the masking module includes: using a cryptographic function to generate a random block, combining the random block with the selected mask, and encrypting the identified bits by using the masked random block.

2. The method of claim 1, wherein the binary pattern has "1"s in bit positions corresponding to the identified bits and "0"s elsewhere.

3. The method of claim 1, wherein the masked random block has "0"s in bit positions not identified by the selected mask and has random binary values in the bit positions identified by the selected mask.

4. An apparatus for encrypting and authentication of a set of plaintext blocks, comprising:
    at least one memory element; and
    at least one processing element configured to execute a set of instructions stored on the at least one memory element, the set of instructions for:
    identifying a set of designated blocks from the plurality of plaintext blocks;
    encrypting the plurality of plaintext blocks into a set of intermediate ciphertext blocks according to a mode of operation, wherein the mode of operation is for encrypting the plurality of plaintext blocks excluding the set of designated blocks and authenticating all of the plurality of plaintext blocks including the set of designated blocks; and
    encrypting each intermediate ciphertext block with a masking module including selecting a mask that has a binary pattern, wherein the binary pattern identifies bits within the corresponding intermediate ciphertext block for encryption by the masking module and encrypting the identified bits within each intermediate ciphertext block by using the selected mask wherein encrypting each intermediate ciphertext block with the masking module includes: using a cryptographic function to generate a random block, combining the random block with the selected mask, and encrypting the identified bits by using the masked random block.

5. An apparatus for encrypting and authentication of a set of plaintext blocks, comprising:
    means for identifying a set of designated blocks from the plurality of plaintext blocks;
    means for encrypting the plurality of plaintext blocks into a set of intermediate ciphertext blocks according to a mode of operation, wherein the mode of operation is for encrypting the plurality of plaintext blocks excluding the set of designated blocks and authenticating all of the plurality of plaintext blocks including the set of designated blocks; and
    means for encrypting each intermediate ciphertext block with a masking module including selecting a mask that has a binary pattern, wherein the binary pattern identifies bits within the corresponding intermediate ciphertext block for encryption by the masking module and encrypting the identified bits within each intermediate ciphertext block by using the selected mask wherein encrypting each intermediate ciphertext block with the masking module includes: using a cryptographic function to generate a random block, combining the random block with the selected mask, and encrypting the identified bits by using the masked random block.

* * * * *